United States Patent
Fanelli

(10) Patent No.: US 6,180,728 B1
(45) Date of Patent: Jan. 30, 2001

(54) APPARATUS FOR THE PRODUCTION OF POLYADDUCTS OF ALKYLENE OXIDES WITH A COMBINED LIQUID-IN-GAS AND GAS-IN-LIQUID DISPERSION REACTOR

(75) Inventor: Pasquale Fanelli, Monza (IT)

(73) Assignee: Linde Aktiengesellschaft, Wiesbaden (DE)

( * ) Notice: Under 35 U.S.C. 154(b), the term of this patent shall be extended for 0 days.

(21) Appl. No.: 09/341,881

(22) PCT Filed: Jan. 15, 1998

(86) PCT No.: PCT/EP98/00195

§ 371 Date: Oct. 5, 1999

§ 102(e) Date: Oct. 5, 1999

(87) PCT Pub. No.: WO98/31459

PCT Pub. Date: Jul. 23, 1998

(30) Foreign Application Priority Data

Jan. 20, 1997 (EP) .................................................. 97830013

(51) Int. Cl.[7] .............................. C08F 2/00; C08G 85/00; C08G 65/34
(52) U.S. Cl. .................................. 526/62; 526/64; 526/65; 526/67; 526/71; 526/89; 526/285; 526/332; 528/425
(58) Field of Search ................................. 526/62, 64, 65, 526/67, 71, 89, 285, 332; 528/425

(56) References Cited

U.S. PATENT DOCUMENTS 2,586,767  2/1952  Wilson .
4,354,020  10/1982  Rotzoll et al. .

FOREIGN PATENT DOCUMENTS 0 419 419   3/1991  (EP) .
0 598 283   5/1994  (EP) .
1 367 524  11/1964  (FR) .
2 457 304  12/1980  (FR) .

*Primary Examiner*—Samuel A. Acquah
(74) *Attorney, Agent, or Firm*—Millen, White, Zelano & Branigan, P. C.

(57) ABSTRACT

The present invention relates to apparatus for the semi-continuous polymerization of monomers with the use of a chain initiator. This apparatus is characterized in that it comprises a reactor (1) arranged with its axis substantially vertical and defining a lower, frustoconical part (III), an upper atomization part (I) and an intermediate part (II), the reactor (1) having monomer and initiator inlet apertures (8, 10, 20, 21) at least one outlet aperture (12), a recycling duct (15) connected at one end to the outlet aperture (12) and at the other end to the upper part (I) through at least one atomizer (9), and a stirrer (25). The apparatus according to the invention has the particular advantage of being usable for reactions with any type of chain initiator and catalyst, whether they are solid, liquid or in suspension. The apparatus according to the invention may also be used in situations where there is risk of damage to the catalyst if this is pumped and in situations where the product obtained has a viscosity such that it cannot be recycled further.

7 Claims, 1 Drawing Sheet

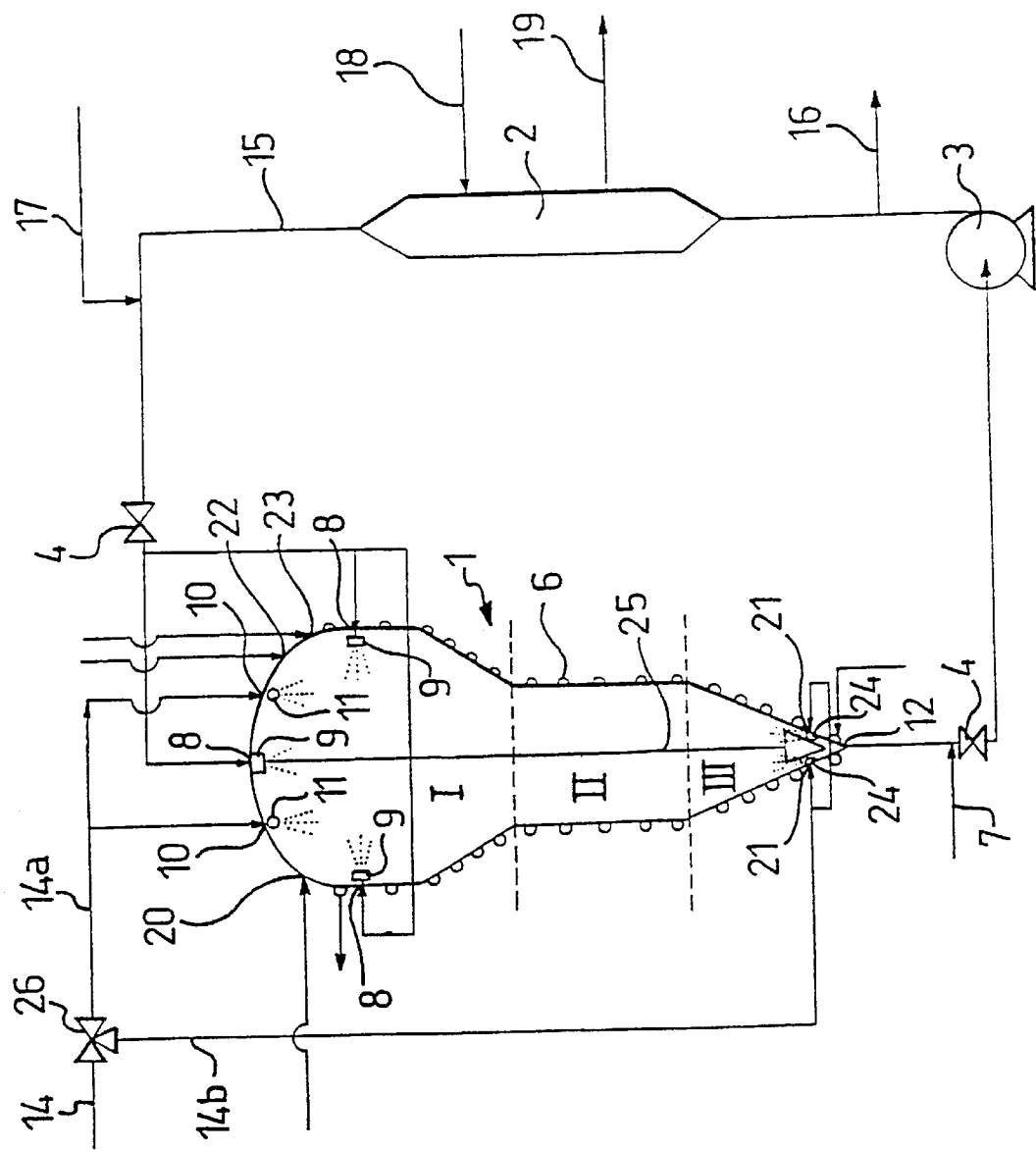

APPARATUS FOR THE PRODUCTION OF POLYADDUCTS OF ALKYLENE OXIDES WITH A COMBINED LIQUID-IN-GAS AND GAS-IN-LIQUID DISPERSION REACTOR

The present invention relates to apparatus for effecting gas-liquid reactions which occur with a gas-in-liquid and liquid-in-gas dispersion mechanism.

In particular, the present invention relates to apparatus for the semi-continuous polymerisation of monomers with the use of a chain initiator.

In a yet more particular embodiment, the present invention relates to new semi-continuous apparatus for the production of polyadducts of alkylene oxides, by an addition reaction of the alkylene oxide on a chain initiator which has at least one active hydrogen. These products, particularly the polyadducts of ethylene and propylene oxides, are used mainly as non-ionic surfactants and polyether-polybls.

Non-ionic surfactants are very widely used as wetting agents, dispersants, stabilisers, emulsifying agents and anti-emulsifying, anti-foaming and foaming agents and, in general, as auxiliary chemicals and functional fluids in the textile, paper, cellulose, pharmaceutical, food, cosmetic, paint, resin, mineral extraction and processing, advanced recovery and extraction of petroleum industries, in chemical adjuvants and functional fluids. In particular the use should be mentioned of non-ionic surfactants based on natural or synthetic fatty alcohols, as primary components in the formulation of household and industrial detergents and also of polyether-polyols as the main intermediates in the production of polyurethanes (rigid, semi-rigid, flexible foams, elastomers, adhesives, sealants, etc).

Italian Patent No. 1 226 405 describes a method for the production of polymerisation products of alkylene oxides starting from alkylene oxides, ethylene and/or propylene oxides being most commonly used, and compounds having an active or mobile hydrogen atom with suitable catalysts. The method of this patent uses a two-section reactor of which the upper is termed the gas-liquid reactor and the lower is an accumulation reservoir, disposed essentially horizontally. The gas-liquid reaction takes place in the upper section, the chain initiator being supplied from a plurality of spray heads on a central distributor while the lower body acts as a receiver and for recycling through a pump and an external heat exchanger, the reaction product coming from the upper section being resupplied to the latter to continue the polymerisation reaction.

Italian Patent No. 1 226 406 describes a method for obtaining polymerisation products of alkylene oxides which uses a two-section reactor of which the upper is termed the gas-liquid reactor and the lower is an accumulation reservoir, each section having a plurality of spray heads. The first phase of the reaction occurs in the lower section which is arranged vertically and continues until a given quantity of polymerisation product is formed; subsequently the polymerisation reaction is transferred to the upper section, arranged horizontally, where the reaction can continue until the desired product is obtained.

The processes described in the aforesaid patents, however, have several disadvantages. First of all they use two-section reactors which complicates the overall structure of the plant and increases costs; two-section reactors also have a large-diameter communication aperture and, for Italian Patent 1 226 406, a larger number of apertures, thus increasing the possibility of loss of alkylene oxide and formation of dead zones and internal surfaces exposed to the oxide. As two-section internal distributors are provided, the surface-volume ratio of these reactors is very high, increasing the probability of secondary reactions. The double-bodied configuration and presence of internal distributors also creates dead spaces within the reactor which makes it difficult to drain and clean the reactor, thus increasing problems in changing production.

As the processes just described are based on the recycling of reagents and of the reaction mixture by means of pumping through ducts or even simply under gravity, the processes described in the aforesaid patents do not allow the use of solid-state chain initiators or suspensions which cannot be pumped, thus limiting their use solely to chain initiators which are liquid or in solution with relatively low viscosities.

It should also be mentioned that the flow under gravity of the reaction product which collects in the upper horizontal section and is then ducted down into the lower one induces retrodiffusion and hence overexposure to the oxide atmosphere.

In order to carry out alkoxylation reactions with solid chain initiators or, in general, with chain initiators which cannot be pumped, it is necessary to use a different type of apparatus.

For this purpose a reactor is usually used which has an internal stirrer and, for example, an internal coil. The chain initiator and the catalyst are loaded into the reactor and then, while being stirred, are melted until they reach an homogeneous liquid state. At this point the reaction may be started by the introduction of the alkylene oxide which is made to flow from the bottom to the top through the liquid phase of the chain initiator and catalyst.

The problem at the root of the invention is that of providing apparatus for the production of polyadducts of alkylene oxides which can be used with any chain initiator, catalyst and alkylene oxide and which also overcomes the problems mentioned above.

This problem is solved, according to invention, by apparatus as claimed in the main claim.

To advantage, the apparatus has the characteristics claimed in the dependent claims.

By virtue of its structural characteristics, the apparatus according to the invention has numerous advantages. As the apparatus has a stirrer within the reactor and an external recycle system for the reaction mixture, it may be used for reactions with any type of chain initiator and catalyst, whether they are solid or liquid. The apparatus according to the invention may also be used if the reagents are in suspension, in situations in which the catalyst may be harmed if pumped and in situations in which the product obtained has a viscosity such that it cannot be pumped and recycled any further.

Should the reagents be easy to pump, the apparatus according the invention may be used with external recycling. In this case the reaction mixture will be returned externally from the lower part of the reactor to the upper part and reintroduced into the latter by atomisation. The reaction will then be optimised by an exchange of material and heat which are very efficient, the reagent being vaporised in contact with particles of catalysed initiator which are finely dispersed in the atmosphere in the reactor.

Should the reagents be difficult or impossible to pump, however, the recycle duct may be excluded from the reaction process and the reaction will occur in the intermediate and lower parts of the reactor, the vaporised reagent being injected from suitable diffusors positioned at the bottom thereof.

The change over from the first to the second type of operation is possible even during the process should the reaction mixture, in time, acquire the necessary characteristics for it to be pumped so that the external recycling system can be used, which is always preferred since, as stated above, it improves the mass and heat exchange processes during the reaction.

This characteristic of the invention is particularly advantageous in situations in which it is desired to produce a product with a high molecular weight (up to 90 times the volume of the chain initiator). In this case the weight ratio between the chain initiator and the normally solid catalyst in the initial load is very high, rendering the initial reaction mixture extremely viscous. As the reaction proceeds, the catalyst concentration falls with the consequent lowering of the viscosity of the reaction mixture. At this point it is then possible to switch the apparatus over from operating with internal stirring to operating with external recycling.

A further advantage of the apparatus according to the invention lies in the particular shape of the reactor. As its lower part is conical, the reactor enables reactions to be carried out with stirring with very small initial quantities of material, whether solid (to be melted), liquid or material in suspension, since this may collect in the bottom of the reactor and form sufficient head to be stirred when external recycling is used but may also reach a sufficiently high level in the reactor, when vaporised reagents are injected from the bottom of the reactor, to allow sufficient contact time between the gaseous phase and the liquid phase for the reaction to occur.

The fact that the reaction can be initiated with a small quantity of chain initiator is particularly advantageous in that, not only does it allow the use of small initial loads, but it also enables final products with high molecular weights to be obtained.

In order to provide a better understanding of the invention, a preferred embodiment thereof will now be described, purely by way of non-limitative example, with reference to the appended drawing.

BRIEF DESCRIPTION OF DRAWING

With reference to this drawing FIG 1/1, apparatus used for the method of the invention includes a reactor 1 having an upper atomising part I, an intermediate part II and a lower conical part III, the intermediate and lower parts being intended for the accumulation of a liquid phase containing a chain initiator, a catalyst, alkylene oxide and intermediate and/or finished reaction products. The section of the upper part I is greater than of that of the intermediate part II, while the section III gradually tapers so as to converge to an outlet aperture 12 for the liquid phase.

The reactor 1 further includes a stirrer 25, four inlets 8, only three of which are visible in the drawing, each having an associated atomiser 9 for atomising the liquid phase recycled to the upper part I of the reactor 1 through a recycling duct 15, a centrifugal pump 3 and a heat exchanger 2, four apertures 10 of which only two are visible in the drawing, each associated with an atomiser 11 for atomising the alkylene oxide supplied through a duct 14 into the upper part I of the reactor 1, three apertures 21, of which only two are visible in the drawing, each associated with three diffusers 24 constituted by porous plates, the diffusers being positioned in the lower part III and spaced at 120° from each other.

The reactor 1 further includes two apertures 22,23 for the introduction of the catalyst in the liquid and solid phase respectively, and an aperture 20 for the introduction of the solid-phase chain initiator directly into the reactor 1.

The atomisers 9 and 11 each comprise a frusto-conical hollow body on which are formed a plurality of small nozzles, in the present example eight nozzles, projecting from the body itself and disposed uniformly thereon.

The atomisers 9 are distributed over the surface of the upper part I of the reactor 1. One of them is at the apex of the reactor 1 while the other three are contained in a plane perpendicular to the longitudinal vertical axis and are spaced circumferentially at 120° from each other. The four atomisers 11 are however disposed symmetrically around the atomiser 9 at the apex of the reactor.

The intermediate part II and lower part III are equipped with half-tubes and/or special plates 6 supplied continuously with diathermic oil or pressurised water for heating and cooling respectively.

A loading duct 7 for the liquid-phase chain initiator is located immediately downstream of the outlet aperture 12 and an outlet duct 16 for the finished product is located between the pump 3 and the heat exchanger 2. An inlet duct 17 for the liquid-phase catalyst, valve means 26 for shutting off the ducts 14a and 14b alternately and valve means 4 for shutting off the recycling duct 15 are also provided. The heat exchanger 2 is supplied with hot or cold pressurised water through inlet and outlet ducts 18 and 19 respectively; any other conventional fluid, such as diathermic oil, may however be used instead of the pressurised water.

When the reaction mixture retains characteristics such that it can be pumped through the entire process, the reactor 1 is filled with the chain initiator through the duct 7 if it is liquid and through the aperture 20 if it is solid until a predetermined weight is reached.

The chain initiator is usually supplied in quantities equal to the ratio between the final quantity of product and the growth ratio, where the growth ratio is defined as the ratio between the molecular weight of the product and the molecular weight of the chain initiator.

The initiator may be melted by means of the heating/cooling equipment 6 and is then recycled by means of the pump 3 through the outlet aperture 12 and the heat exchanger 2 and reintroduced into the reactor 1 through the duct 15 by means of the atomisers 9 in the form of finally-dispersed droplets. At the same time, in order to start the alkoxylation reaction, to speed it up and whenever necessary, a catalyst is introduced into the reactor and must disperse completely in the chain initiator to cause the alcoholate to react in situ. Generally it is advisable to use a basic catalyst and this is selected from the group comprising hydroxides and alcoholates of alkali metals and alkaline-earth metal hydroxides. Acid catalysts may, however, be chosen even though these are not preferred since they have the disadvantage of increasing the dioxan concentration in the product.

The catalyst is introduced into the reactor through the ducts 17 and 15 if it is liquid and through the aperture 23 if it is solid; a fine dispersion of droplets containing the chain initiator, the catalyst and water is thus obtained in the top of the reactor. The feed is dispersed over a complete cone which may vary from 15° to 150° and is effected with atomisers which form droplets with a Sauter diameter of less than 500 microns.

The catalysed chain initiator is dried by heating and vacuum.

Once the optimum conditions (temperature, catalyst concentration, degree of humidity, pressure, etc) for initiating the reaction have been reached, the supply of alkylene oxide through the duct 14a, the apertures 10 and the atomisers 11 is started.

This addition occurs with automatic control of the mass flow rate, pressure and reaction temperature, transmitted directly from the reactor and from the reaction circuit, and of the temperature of the cooling fluid.

The alkoxylation reaction is normally carried out at a temperature which may vary between 70° C. and 195° C., preferably between 90° C. and 180° C., according to the type of production, and at a relative pressure determined partly by the presence of an inert gas, generally nitrogen, and partly by the alkylene oxide itself. The relative reaction pressure generally does not exceed 6 $10^\circ$ kPa, in the case of ethylene oxide or mixtures of ethylene oxide/propylene oxide and may reach 12 $10^\circ$ kPa with only propylene oxide.

The supply of alkylene oxide results in the absorption of the latter by the droplets of catalysed chain initiator in the upper part of the reactor 1 and hence the chemical reaction in the intermediate and lower parts II and III reactor 1. In fact the droplets saturated with alkylene oxide coalesce on the free surface of the liquid phase in the reactor 1 where the alkoxylation reaction takes place. The liquid phase, after a suitable stay time, is recycled through the duct 15 and is fed continuously into the top of the reactor 1 through the atomiser 9.

During the recycling, the liquid phase continuously gives up its heat, a great deal of which is released by the highly exothermic alkoxylation reaction, through the heat exchanger 2 to which pressurised cooling water is supplied at the same time. The reaction then continues, the alkylene oxide being supplied continuously until the desired molecular growth is reached. The product is then cooled and, if necessary, stripped and neutralised and finally discharged from the reactor and the relative circuit through the duct 16 before a further production cycle is started.

The high transfer of material provides more favourable reaction conditions and also more thorough deaeration and dehydration of the chain initiator with the result that fewer undesirable byproducts and contaminants are formed. The product thus obtained is of better and more consistent quality.

The shape of the reactor is such as to give a smaller surface-volume ratio and maximum gas-liquid contact time in the upper part I of the reactor. This minimises the ratio between the metal surface (S) exposed to the gaseous alkylene oxide and the free volume (V) of the vaporised oxide itself, this ratio being no greater than, for example, 1.55 $m^{-1}$ for 10 ton/batch reactors and 1.30 $m^{-1}$ for 50 ton/batch reactors, and a very high concentration gradient of the alkylene oxide from the top to the bottom of the reactor and a very high temperature gradient from the bottom to the top of the reactor are achieved. The almost total lack of residual oxide in the reactor, particularly in the parts where the temperature is highest, provides greater safety, particularly with regard to the danger of explosions, than in conventional reactors which have an oxide-bubble dispersion model.

The distribution of the atomisers over the inner surface of the upper part I of the reactor enables 100% of the entire volume of the reactor to be covered, whatever the level of reaction liquid, thus maximising the transfer of material whatever growth is required and minimising the coalescence of droplets on the walls before they reach the free surface of the liquid phase. As the liquid reaction mixture is sprinkled over the entire inner surface of the upper part I of the reactor, the formation of hot spots caused by localised heat flows from the exterior of the reactor is avoided completely, thus reducing considerably the probability of explosions in the reactor itself, even when the reactor is operated within the limits of explosivity of the alkylene oxide.

The apparatus according to the present invention allows the concentration of dioxan in the final product to be reduced surprisingly compared with the prior art and is thus more ecological and less harmful to health.

The arrangement of the atomisers over the inner surface of the upper part I of the reactor enables the entire internal surface of the reactor to be washed effectively with very small quantities of water or solvent. Given the high degree to which the reactor can be drained, the washing liquid discharged is consequently poorer in noxious substances and its regeneration is thus less difficult.

If the reaction mixture never reaches a state in which it can pumped during the process, the reactor 1 is isolated by suitable valve means 4 from the external recycling circuit and is filled with the chain initiator through the duct 7, if it is liquid, and through the aperture 20, if it is solid, until a predetermined weight is reached. If solid, the chain initiator is previously melted and then stirred by means of the stirrer 25. At the same time the catalyst to be used for the polymerisation reaction is introduced, through the aperture 22 if it is liquid and through the aperture 23 if it is solid, the catalyst being dispersed completely in the stirred liquid phase of the chain initiator. The catalysed chain initiator is dried by heating and vacuum.

Once the optimum conditions (temperature, catalyst concentration, degree of humidity, pressure, etc) for initiating the reaction have been reached, the supply of alkylene oxide is started through the duct 14b, the apertures 21 and diffusers 24. This starts the injection of the oxide, from the bottom upwardly, through the stirred liquid phase of chain initiator and catalyst, and hence the chemical reaction starts in the intermediate part II and the lower part III of the reactor 1. Excess heat which is released by the exothermic polymerisation reaction is removed by means of the heat-exchange device 6 with its half tubes and/or special plates.

Alternatively the heat-exchange device 6 may, obviously, be of a different type; for example it may be constituted by an internal coil.

Once the desired molecular growth has been reached, the supply of alkylene oxide is cut off and the product obtained is discharged.

As already mentioned, the apparatus according to the invention may be used in situations in which the reaction mixture reaches a state in which it can be pumped only after a certain period of time.

In this case the apparatus according to the invention will be used firstly in the manner just described and subsequently, once the reaction mixture has reached the critical viscosity, will be switched to operating with external recycling.

EXAMPLE 1

Production of 10,000 kg of octylphenol +9.5 moles of ethylene oxide 3,441 kg of solid octylphenol (mw 208) and 10 kg of solid KOH, as catalyst, were loaded into the plant described above, the reactor having a S/V ratio of 1.55 $m^{-1}$. After the solid had been introduced, it was melted by heating and with stirring and, once the liquid phase had been formed, external recycling was started. The mass was dried at 135° C. under a vacuum of 5 mbar and, after the vacuum had been broken with nitrogen and the mass had been heated to the reaction temperature (160° C.), 6559 kg of ethylene oxide were reacted at a maximum relative pressure of 4.75 $10^\circ$ kPa.

At the end of the reaction, the mass was cooled, neutralised and discharged. No stripping or post-treatments were carried out.

The overall time for the production was 220 minutes from the loading of the first solid material to the discharge of the final product.

The quality of the product was as follows:

| | |
|---|---|
| Appearance (25° C.) | limpid |
| Colour | 30 max |
| water (ppm) | 1000 max |
| PH (5% aqueous solution, 25° C.) | 6–7 |
| Hydroxyl no (mg KOH/g) | 89.5 |
| Polyethylene glycol (% weight) | 0.50 max |

EXAMPLE 2

Production of 10,000 kg of polypropylene glycol of M.W. 5,900

113 kg of dipropylene glycol and 25 kg of solid KOH were loaded into the plant described above, the reactor having an S/V ratio of 1.55 m$^{-1}$, and the mass was dried at 135° C. and under a vacuum of less than 5 mbar. The vacuum was broken with nitrogen and the reactor brought to 97° C., at which temperature 9887 kg of propylene oxide were reacted to reach a molecular weight of 5900 in a single operation, at a maximum relative pressure of 5 10° kPa.

After the reaction and stripping of the residual propylene oxide, the product was discharged from the reactor. The overall production time was 1,650 minutes from the loading of the first material to the discharge of the final product. The quality of the product was as follows:

| | |
|---|---|
| Appearance (25°) | Liquid |
| Colour, APHA | 10 max |
| Molecular Weight | 5,900 |
| Hydroxyl no (mg KOH/g) | 19 |
| Viscosity | 1,750 cSt |
| Unsaturation | 0.05 meq/g |

In the examples just described, octylphenol and dipropylene glycol were used respectively as the chain initiators.

Obviously, compounds having at least one active hydrogen may be used as the chain initiators; examples of such chain initiators may be found among the alkylphenols, such as octylphenol, nonylphenol, dodecylphenol, dinonylphenol, tristyrylphenol; natural and synthetic fatty alcohols and mixtures thereof, such as decyl alcohol, tridecyl alcohol, oleyl alcohol, oleylacetyl alcohol, cetylstearyl alcohol, lanolin, cholesterol, acetylene diol; fatty amines and hydrogenated amines, such as laurylamine, oleylamine, cocoamine, tallow amine and soya amine, soya iminopropylenamine, abietylamine; fatty amides, such as laurylamide, stearyl amide, fatty amides derived from coconut oil, soya and tallow; fatty acids such as coconut, lauric, tallow, stearic, palmitic, oleic, myristic, linoleic, abietic and naphthenic acids; sorbitan esters such as the monolaurate, monopalmitate, monostearate, mono-oleate. monoabietate, dilaurate, tristearate, trioleate, pentalaurate, hexaoleate, hexastearate; monoglycerides and monostearates of, for example, coconut and glycerol; pentaerythritol esters, such as the monolaurate, mono-oleate and of lanolin; ethylene glycols, such as mono-, di-, tri-ethylene glycols and polyethylene glycols and propylene glycols, such as mono-, di-, tri-propylene glycols and polypropylene alycols; ethylene oxide/propylene oxide block polymers and random sequences thereof based on various chain initiators, such as fatty amines, fatty alcohols, glycerol, dipropylene alycol etc; oils such as castor-oil, hydrogenated castor-oil, mink oil, tallow and tall oil; mercaptans such as dodecyl mercaptan.

What is claimed is:

1. Apparatus for the semi-continuous polymerisation of monomers with the use of a chain initiator, characterised in that it comprises:

a reactor (1) arranged with its axis substantially vertical and defining a lower frusto-conical part (III), an upper, atomisation part (I) and an intermediate part (II), the section of the upper part (I) being larger than that of the intermediate part (II) and the reactor (1) being provided with:

inlet apertures (8), (10), (20), (21) for the monomer and initiator, at least one outlet aperture (12), at least one atomiser (9) located in the upper part (I), at least one atomiser (11) for atomising the monomer in the reactor (1), located in the upper part (I), at least one distributor device (24) located in the lower part (III) for distributing the monomer vaporised in the reactor, a stirrer (25) arranged longitudinally within the tubular body of the reactor (1), means (6) for heating and cooling the intermediate part (II) and the lower part (III), a recycling duct (15) connected at one end to the outlet aperture (12) and at the other end to the upper part (I) through a pump (3) and the at least one atomiser (9), valve means (26) for the alternate use of the said at least one atomiser (9) and the at least one distributor device (24) and, valve means (4) for shutting off the recycling duct (15).

2. Apparatus according to claim 1, characterised in that it includes heat-exchange means (2) downstream of the pump (3) on the recycling duct (15).

3. Apparatus according to claim 1, characterised in that it includes apertures (22), (23) for the introduction of liquid and solid catalysts respectively.

4. Apparatus according to claim 1, characterised in that the at least one distributor device (24) is a porous plate diffusor.

5. Apparatus according to claim 1, in which each atomiser (9), (11) comprises a hollow substantially frusto-conical body which projects inwardly from the wall of the reactor from a larger-diameter end at which the atomisers (9), (11) are in fluid communication with the recycling duct (15) and a duct (14) for the supply of the alkylene oxide respectively, a plurality of nozzles being formed in the hollow body and homogeneously distributed over the surface thereof.

6. Apparatus according to claim 1, in which the at least one atomiser (9), (11) is located and arranged over the entire inner surface of the upper part (I) of the reactor (1), while the at least one distributor device (24) is located on the inner surface of the lower, conical part (III).

7. Process for the semi-conductor polymerization of monomers with the use of a solid chain initiator, comprising, in the order, the steps of:

providing an apparatus according to claim 1;

stirring one reaction mixture containing the monomer and the chain initiator in the lower part (III) of said apparatus, until it reaches a viscosity so that it can be recycled;

recycling said reaction mixture to the upper part (I) of said apparatus and spraying it by means of atomizers (9), the monomer being sprayed by means of atomizers (11), until the product has reached the desired molecular weight.

* * * * *

UNITED STATES PATENT AND TRADEMARK OFFICE
CERTIFICATE OF CORRECTION

PATENT NO.   : 6,180,728 B1
DATED        : January 30, 2001
INVENTOR(S)  : Pasquale Fanelli It is certified that error appears in the above-identified patent and that said Letters Patent is hereby corrected as shown below:

<u>Title page,</u>
ABSTRACT, line 6, reads "atonization" should read -- atomisation --;

<u>Column 8, claim 7,</u>
Line 1, reads "semi-conductor" should read -- semi-continuous --;
Line 5, reads "stirring one" should read -- stirring the --

Signed and Sealed this

Ninth Day of April, 2002

*Attest:*

*Attesting Officer*

JAMES E. ROGAN
*Director of the United States Patent and Trademark Office*